No. 719,934. PATENTED FEB. 3, 1903.
C. L. BUTLER.
DEVICE FOR CUTTING RODS.
APPLICATION FILED JUNE 24, 1902.
NO MODEL.
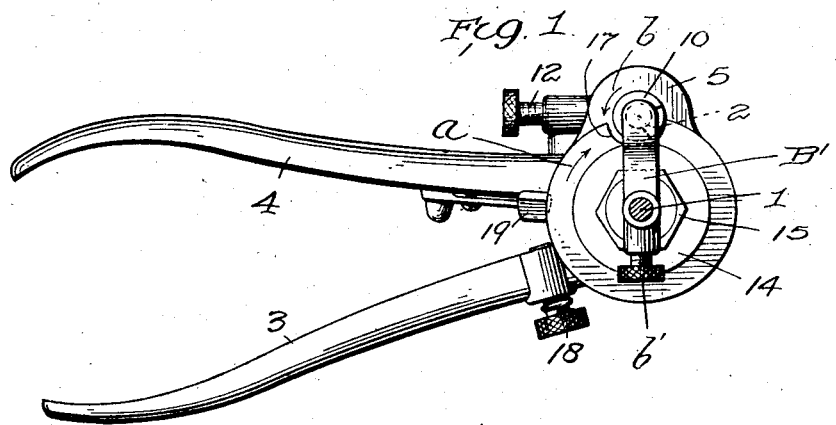
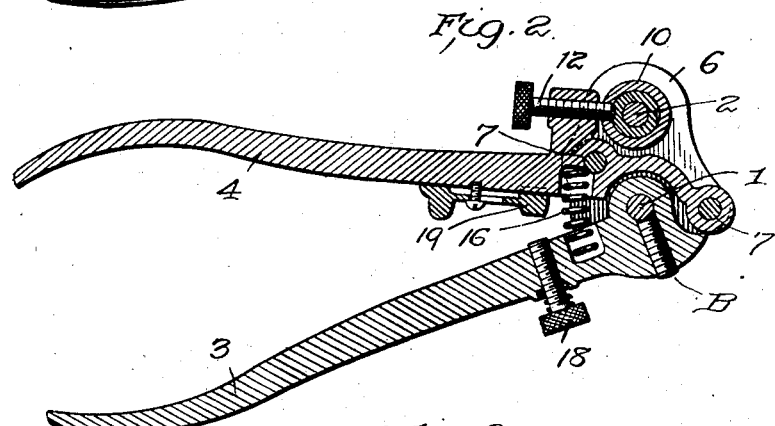
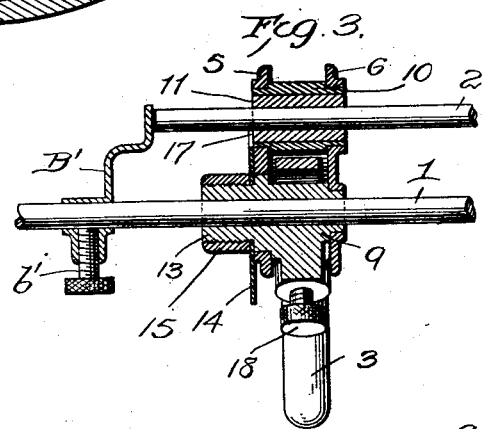
Attest:
C. S. Middleton
James McShan
Inventor:
Calvin L. Butler.
by F. L. Middleton
Atty.

UNITED STATES PATENT OFFICE.

CALVIN L. BUTLER, OF GREENFIELD, MASSACHUSETTS.

DEVICE FOR CUTTING RODS.

SPECIFICATION forming part of Letters Patent No. 719,934, dated February 3, 1903.

Application filed June 24, 1902. Serial No. 113,024. (No model.)

*To all whom it may concern:*

Be it known that I, CALVIN L. BUTLER, a citizen of the United States, residing at Greenfield, Franklin county, and State of Massachusetts, have invented certain new and useful Improvements in Devices for Cutting Rods, of which the following is a specification.

My invention relates to improvements in devices for cutting off short sections of metal rods which are held in and rotated by a suitable mandrel or work-holder, the cutting being effected by a relatively stationary cutting plate or tool.

The object of the invention is to provide a tool which will be more simple in construction and more convenient in operation and in which the cutting edge of the cutter may be advanced to its work radially of the rod being operated upon by a simple rotary motion, thus avoiding complicating operating means heretofore used for securing a rectilineal movement of the cutter. The tool is designed to be used in connection with any suitable lathe mechanism for turning the rod to be cut and with a gage for determining the length of the sections to be cut.

In the present application I have not shown a lathe mechanism, as this forms no part of the present invention.

I have illustrated the invention in the accompanying drawings, in which—

Figure 1 is a side elevation of the tool. Fig. 2 is a longitudinal sectional view. Fig. 3 is a transverse sectional view showing the gage and the rod being operated upon in their relative positions.

In the drawings the numeral 1 indicates the gage-rod, and 2 the rod to be cut, which is rotated by any suitable lathe mechanism, which is not shown herein, as it forms no part of the present invention. The cutting-tool is provided with an opening through which the gage-rod passes, and a second opening through which the rod to be cut passes and in which it turns, as will be hereinafter more fully described.

The tool or implement comprises a pair of handle members 3 and 4, which are connected together so as to have pivotal movement in relation to each other by two side plates 5 and 6. The handle member 4 has openings 7, through which pass screws which connect the two side plates and the handle member 4 rigidly together. A sleeve 9 is journaled in openings in the side plates, this sleeve being cast onto the other handle member 3. A second sleeve 10 is located between the plates, being provided with reduced or rabbeted ends, which fit in openings in the plates, whereby the sleeve is retained in place. Within this sleeve 10 a tubular bearing member or sleeve 11 is inserted, within which the rod to be cut turns, this being held in place by a set-screw 12 passing through a lug on the handle member 3 and through an opening in the sleeve 10 and engaging the bearing member.

Sleeve 9 has a threaded extension 13, which is designed to receive the circular cutting-tool 14, which is clamped firmly upon the threaded extension by a nut 15, so as to be slightly oscillated when the handles are brought together and supported. A spring 16, having its ends seated in recesses in the handle members, tends to keep them forced apart, and by grasping the handle members with the hand they may be readily forced together. The circular cutter is of such a size or diameter that its peripheral edge is on the line of the axis of the tubular bearing 11. It has a semicircular cut-out portion 17, and the point where this semicircle meets the peripheral edge of the circular cutter forms the cutting edge. The direction of rotation of the stock or rod is indicated by the arrow $a$, and the direction of movement of the cutter as it is being oscillated to advance the cutting edge to its work is indicated by the arrow $b$. By this arrangement it will be seen that I cut against the outer or peripheral edge of the cutter instead of cutting against the radial edge. The result is that it needs only a rotary movement of the cutting-disk to cause the cutting edge to advance to its work in a path in line with the radius of the rod being operated upon. It will also be seen that the line of resistance of the cutter to the cutting action is on the radius of the cutter, and thus a plain clamped nut, as shown, is amply sufficient to hold the cutter to its work.

I limit the movement of the handle members toward and from each other by a set-screw 18, passing through one of the members and abutting against a stop or bearing piece 19 on the other member.

It will be understood that as fast as each section of the rod is cut the cutter is moved along the rod for a sufficient distance to cut a fresh length. In order to properly gage the rod to be cut, I provide a section of rod 1, which is clamped in the opening in the part 9 by the set-screw B.

A gage or stop-piece B' is mounted to slide on this rod and is adjustably clamped in any desired position by a screw $b'$, having a milled head for convenience of operation. This stop-piece extends up a sufficient distance to project into the line of the rod to be cut, and when a fresh section is to be severed from the main portion the tool is moved longitudinally along the rod 2 until the stop piece or arm contacts with the end of the rod 2, as shown in Fig. 3.

The movement of the handle 3 in the cutting operation oscillates the rod 1 to a sufficient extent to carry the stop-arm away from the rod by the time the rod is severed. Then when the handle is opened the stop-arm is returned into the line of the rod ready to act to gage a fresh section.

Having thus described my invention, what I claim is—

1. A rod-cutter having a bearing for the rotating rod and a circular cutting-blade having its peripheral edge on a line with the axis of the bearing, said cutting-blade having a semicircular or arc-shaped recess in its edge and means for giving said cutting-blade a partial rotation, substantially as described.

2. A rod-cutter comprising a frame having a bearing for the rotating rod to be cut, a handle member pivoted in said frame, a circular cutter mounted to be oscillated by the said hand-lever and having its circumferential edge in line with the axis of the rod to be cut, substantially as described.

3. In combination, the frame comprising the side plates and a stationary handle member, a movable handle member pivoted between said side plates, a bearing-sleeve for the rotating rod to be cut, carried by said side plates, and a cutting-blade mounted to be oscillated by said movable handle member, substantially as described.

4. In combination, the side plates, the bearing-sleeve for the rod to be operated on, carried by said side plates, the stationary handle member rigidly connected to the side plates, a tubular sleeve carried by the side plates and adapted to receive a gage-rod, a movable handle member mounted to oscillate on said sleeve and a cutter also carried by said sleeve and a stop-arm carried by said gage-rod, substantially as described.

5. In combination, the side plates, the stationary handle member secured between and connecting said side plates, a bearing-sleeve for the rod to be operated upon carried by the plates, a second sleeve having its ends located in openings in the plate and adapted to oscillate therein, one of said ends being extended and screw-threaded, a handle member rigidly connected to said sleeve, a circular cutter mounted on the threaded end of the sleeve and a nut on said threaded end for clamping the cutter in position, substantially as described.

6. In combination, the side plates and rigid handle member, the movable handle member, the oscillating cutter operated thereby, the sleeve carried by said plates with the axis of the sleeve in line with the periphery of the cutter and the bearing for the rod to be operated upon removably held within said sleeve, substantially as described.

In testimony whereof I affix my signature in presence of two witnesses.

CALVIN L. $\overset{\text{his}}{\times}$ BUTLER.
$\phantom{CALVIN L. }_{\text{mark}}$ Witnesses:
CAROLINE T. BUTLER,
CHARLES N. STODDARD.